US012728556B2

(12) United States Patent
Svensson et al.

(10) Patent No.: US 12,728,556 B2
(45) Date of Patent: Sep. 8, 2026

(54) MACHINE FOR DIVIDING A TIMBER BODY AND METHOD FOR CONTROLLING SUCH A MACHINE

(71) Applicant: USNR AB, Söderhamn (SE)

(72) Inventors: Lennart Svensson, Hultsfred (SE); Mats Ekberg, Rimbo (SE)

(73) Assignee: USNR AB, Söderhamn (SE)

(*) Notice: Subject to any disclaimer, the term of this patent is extended or adjusted under 35 U.S.C. 154(b) by 204 days.

(21) Appl. No.: 18/835,412

(22) PCT Filed: Feb. 1, 2023

(86) PCT No.: PCT/EP2023/052375
§ 371 (c)(1),
(2) Date: Aug. 2, 2024

(87) PCT Pub. No.: WO2023/148186
PCT Pub. Date: Aug. 10, 2023

(65) Prior Publication Data
US 2025/0144836 A1 May 8, 2025

(30) Foreign Application Priority Data
Feb. 4, 2022 (SE) .................................... 2250110-0

(51) Int. Cl.
*B27B 1/00* (2006.01)
*B27B 15/08* (2006.01)
*B27B 25/02* (2006.01)

(52) U.S. Cl.
CPC .............. *B27B 1/007* (2013.01); *B27B 15/08* (2013.01); *B27B 25/02* (2013.01)

(58) Field of Classification Search
CPC ......... B27B 1/007; B27B 15/08; B27B 25/02; B23D 55/04
See application file for complete search history.

(56) References Cited

U.S. PATENT DOCUMENTS 3,692,074 A 9/1972 Nilsson
4,144,782 A 3/1979 Lindstrom
(Continued)

FOREIGN PATENT DOCUMENTS

CA 2022857 A1 2/1992
EP 1125701 A1 8/2001
(Continued)

*Primary Examiner* — Khaled Annis
(74) *Attorney, Agent, or Firm* — The Webb Law Firm

(57) ABSTRACT

A machine and a method for controlling such a machine that includes a feeder unit and a sawing station, the feeder unit being located upstream the sawing station. The sawing station includes a first sawing unit including a set of first saw band(s) and a pair of first support rollers, and a second sawing unit including a set of second saw band(s) and a pair of second support rollers, wherein the location of each support roller is adjustable in the transverse direction. The support rollers are configured to engage the timber body. The method is characterized by the steps of feeding the timber body by means of the feeder unit into the sawing station during the timber body dividing operation. The pair of first support rollers engage the timber body, positioning the pair of second support rollers at an initial mutual distance correlating to the real width of the timber body, and decreasing the mutual distance between the pair of second support rollers during the timber body dividing operation until reaching. At the end of the timber body dividing operation, a final mutual distance between the pair of second support rollers correlating to the real width of the timber body minus the total thickness of the set of first saw band(s).

13 Claims, 4 Drawing Sheets

(56) References Cited

U.S. PATENT DOCUMENTS

| | | | | | |
|---|---|---|---|---|---|
| 4,416,312 | A | | 11/1983 | Östberg | |
| 4,637,443 | A | | 1/1987 | Jansson | |
| 4,838,968 | A | * | 6/1989 | Nelson | B32B 3/30 428/167 |
| 4,879,659 | A | * | 11/1989 | Bowlin | B27B 25/00 144/357 |
| 5,813,302 | A | * | 9/1998 | Haglund | B27B 7/00 83/425.2 |
| 2025/0144836 | A1 | * | 5/2025 | Svensson | B27B 25/02 |

FOREIGN PATENT DOCUMENTS

| | | | |
|---|---|---|---|
| FR | 2662387 | A1 | 11/1991 |
| GB | 2411861 | A | 9/2005 |

* cited by examiner

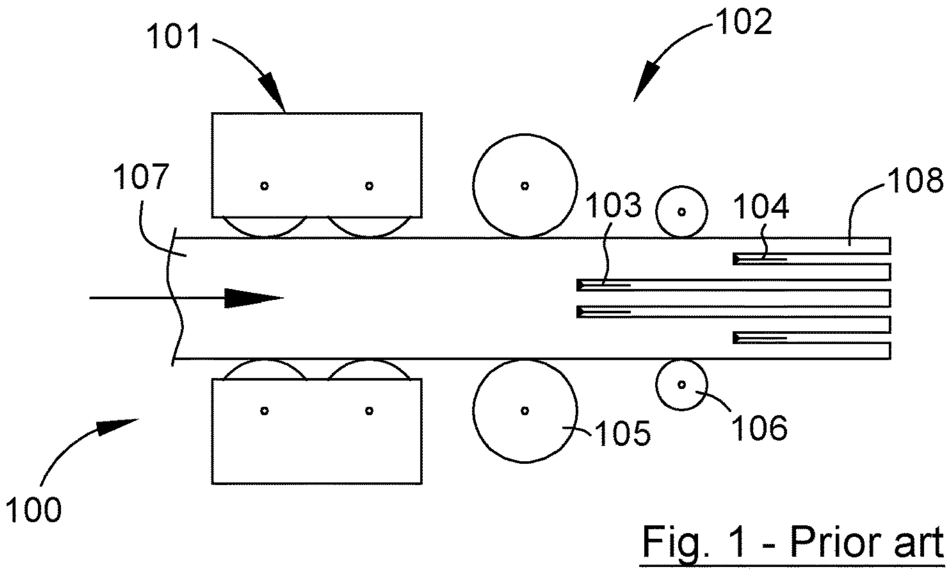
Fig. 1 - Prior art
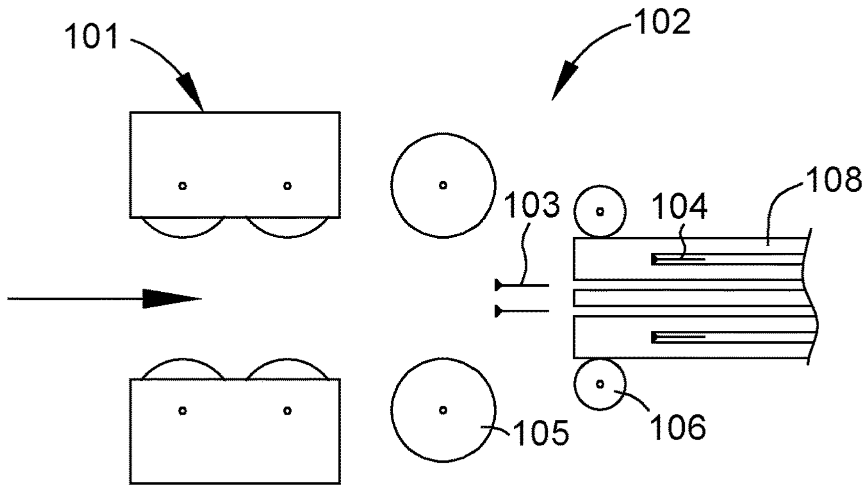
Fig. 2 - Prior art
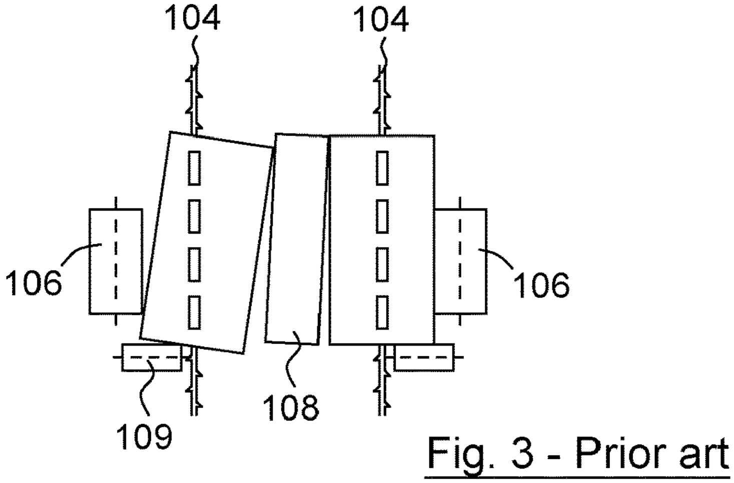
Fig. 3 - Prior art

MACHINE FOR DIVIDING A TIMBER BODY AND METHOD FOR CONTROLLING SUCH A MACHINE

CROSS-REFERENCE TO RELATED APPLICATIONS

This application is the United States national phase of International Application No. PCT/EP2023/052375 filed Feb. 1, 2023, and claims priority to Swedish Patent Application No. 2250110-0 filed Feb. 4, 2022, the disclosures of which are hereby incorporated by reference in their entireties.

BACKGROUND OF THE INVENTION

Field of the Invention

The present invention relates in general to a machine for dividing a timber body into smaller timber pieces during a timber body dividing operation, wherein the machine comprises a plurality of band saws. The present invention also relates to a method for controlling such a machine.

The present invention relates in particular to a machine comprising a feeder unit and a sawing station, the feeder unit being located upstream the sawing station. The sawing station comprises a first sawing unit comprising a set of first saw band(s)/blade(s) and a pair of first support rollers configured to cooperate with the set of first saw band(s), and a second sawing unit located downstream said first sawing unit, and comprising a set of second saw band(s)/blade(s) and a pair of second support rollers configured to cooperate with the set of second saw band(s). The location of each support roller is adjustable in the transverse direction and wherein the support rollers are configured to engage the timber body during the timber body dividing operation. The present invention also relates to a method for controlling such a machine.

Description of Related Art

All modern sawmill industry utilizes sawing lines, which often includes a large number of stations, the majority of which have a high level of automatization in order to obtain an optimal output, i.e. boards/timber pieces, from the raw material in the shape of round logs/timber bodies.

In addition, it is a primary aim that the timber pieces sawn from a larger timber body present intended dimensions with minimum variations in each dimension category, as well as along each timber piece. It is desirable to reduce the variations of dimension to a minimum, since such timber is assigned a high-quality category, thereby resulting in a maximal financial yield. The demands from the sawmill owner that every station along the sawing line shall generate products having great dimensional accuracy are therefore exceptionally strict. A most frequently occurring demand is that the variation within a dimension category, regarding the thickness of the timber pieces, shall not be more than 0.5 millimeter.

When elucidating the dimensional accuracy of a saw band and the adjustment accuracy of a band saw carrying the saw band, in the light of abovementioned precision demands, it is easily realized that the room for other guiding deficiencies in such a saw operation is exceptionally small. In other words, the smallest deviation of the timber body from the intended feeding path results in the risk of getting timber pieces with dimensions, which doesn't fall within the predefined limits.

Especially at the end of the timber body dividing operation the timber pieces are prone to tilt. See FIGS. 1-3 disclosing the disadvantage of prior art solutions/machines.

FIG. 1 disclose a machine, generally designated 100, wherein the the machine 100 comprises a feeder unit 101 and a sawing station, generally designated 102. The sawing station 102 comprises two leading saw bands 103 and two trailing saw bands 104, wherein two leading support rollers 105 cooperate with the leading saw bands 103 and two trailing support rollers 106 cooperate with the trailing saw bands 104. The feeder unit 101 feed the timber body 107 in the axial direction towards the sawing station 102, wherein the timber body 107 is divided into smaller timber pieces 108. The support rollers are configured to engage the timber body 10 during the timber body dividing operation. At the beginning, and during the major part, of the timber body dividing operation there is minor problem to secure acceptable deviations of the dimensions of the smaller timber pieces.

However, with reference to FIGS. 2 and 3, when the timber body 107 has passed the leading saw bands 103, there is no guidance of the individual timber pieces 108 whereby it is an inherent risk that the timber pieces 108 will tilt and/or move in the transversal direction during the last part of the timber body dividing operation, resulting in large deviations in the dimensions. The dimensional deviations at the end of the timber pieces lead to in a lower-quality category for the individual timber piece or the need for trimming/scrapping the end of the timber piece. Both actions leading to less financial yield and/or waste of raw material. A tilting of the timber pieces also entail that saw bands are subject to lateral forces that increase the risk for breaking the saw band. The horizontal support rollers 109 located below the timber body 107 are configured to bias the outer timber pieces 108 in the transversal direction towards the trailing support rollers 106. These horizontal support rollers 109 have intended effect during the beginning, and during the major part, of the timber body dividing operation, but when the timber body has passed the leading saw bands 103 the effect of the horizontal support rollers 109 may unfortunately amplify the tilting motion of the outer timber pieces 108.

OBJECT OF THE INVENTION

The present invention aims at obviating the aforementioned disadvantages and failings of previously known machines and method for controlling such machines, and at providing an improved machine and method. A primary object of the present invention is to provide an improved machine of the initially defined type wherein the timber pieces are prevented from tilting and/or transversal movement at the end of the timber body dividing operation.

SUMMARY OF THE INVENTION

According to the invention at least the primary object is attained by means of the initially defined machine and method having the features defined in the independent claims. Preferred embodiments of the present invention are further defined in the dependent claims.

According to the present invention, there is provided a machine of the initially defined type, which is characterized in that the pair of second support rollers are configured to be displaced in relation to each other during a timber body dividing operation from an initial mutual distance correlating to the a predetermined real width of the timber body at the beginning of the timber body dividing operation to a final mutual distance correlating to the real width of the timber body minus the total thickness of the set of first saw band(s) at the end of the timber body dividing operation.

According to the present invention, there is provided a method of the initially defined type, which is characterized by the steps of:

feeding the timber body by means of the feeder unit into the sawing station during the timber body dividing operation, wherein the pair of first support rollers engage the timber body, before the timber body reaches the second sawing unit, positioning the pair of second support rollers at an initial mutual distance correlating to a real width of the timber body, wherein the pair of second support rollers engage the timber body when the timber body reaches the second sawing station, and decreasing the mutual distance between the pair of second support rollers during the timber body dividing operation from said initial mutual distance until reaching, at the end of the timber body dividing operation, a final mutual distance between the pair of second support rollers correlating to the real width of the timber body minus the total thickness of the set of first saw band(s).

Thus, the present invention is based on the insight of removing the saw cuts made by the leading saw blades and thereby preventing the timber pieces from tilting and/or mutual movement when the pair of first support rollers disengage the timber body. Thus, when having perfect control of the location and orientation of the timber body and the timber pieces during the entire timber body dividing operation, the dimensional accuracy of the timber pieces will be fulfilled.

According to various embodiments of the present invention, the initial mutual distance between the pair of second support rollers is equal to or less than the real width of the timber body. By having the pair of second support rollers pressing the partly divided outer timber pieces inwards also during the beginning of the timber body dividing operation, further enhance the control of the location and orientation of the timber body during the entire timber body dividing operation.

According to various embodiments of the present invention, the initial mutual distance between the pair of second support rollers is equal to the real width of the timber body minus 0.5-2 millimetres. Thereby, the partly divided timber pieces will contact/engage each other at the leading edge of the timber body, and thereby stabilize the partly divided timber pieces, before the trailing end of the timber body passes/disengage the pair of first support rollers. Thus, further enhancing the control of the location and orientation of the timber body during the entire timber body dividing operation.

According to various embodiments of the present invention, the final mutual distance between the pair of second support rollers is reached after the teeth of the set of first saw band(s) disengage the timber body. Thereby, it is secured that the set of first saw band(s) are not clamped between the timber pieces and thereby the risk to break the saw bands is decreased.

According to various embodiments of the present invention, each saw band of the set of second saw band(s) is associated with one support roller of the pair of second support rollers, and wherein the transverse distance between the individual saw band of the set of second saw band(s) and the corresponding support roller of the pair of second support rollers is kept constant during the decrease of the mutual distance between the pair of second support rollers. Thereby, the dimensional accuracy of the thickness of the individual outer timber piece is secured.

BRIEF DESCRIPTION OF THE DRAWINGS

The terms Fig., Figs., Figure, and Figures are used interchangeably in the specification to refer to the corresponding figures in the drawings.

A more complete understanding of the abovementioned and other features and advantages of the present invention will be apparent from the following detailed description of preferred embodiments in conjunction with the appended drawings, wherein:

FIG. 1 PRIOR ART—is a schematic view from above of a conventional machine for dividing a timber body into smaller timber pieces, at the beginning of a timber body dividing operation, FIG. 2 PRIOR ART—is a schematic view from above of the machine according to FIG. 1, at the end of a timber body dividing operation, and FIG. 3 PRIOR ART—is a schematic end view from the upstream direction of the trailing support rollers and trailing saw bands, at the end of a timber body dividing operation.

DESCRIPTION OF THE INVENTION

Figure 4:
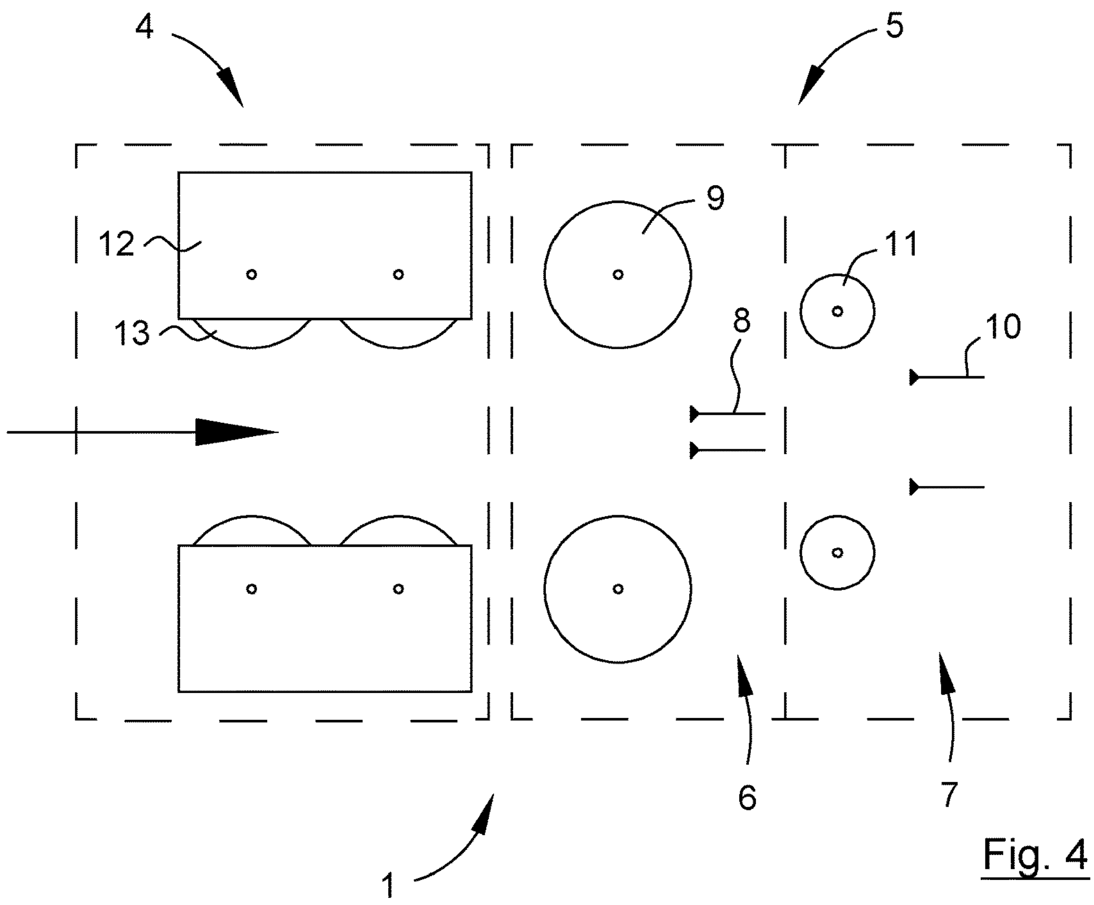
FIG. 4 is a schematic view from above of an inventive machine for dividing a timber body into smaller timber pieces.

Reference is initially made to FIG. 4. The present invention relates to a method and machine, generally designated 1, configured for dividing a timber body 2 into a plurality of smaller timber pieces 3 during a timber body dividing operation. The inventive machine 1 is usually part of a saw line of a sawmill, wherein the saw line comprises a plurality of stations including one or more machines 1 for dividing a timber body (such as log or block/cant) into smaller timber pieces (such as planks or boards). Logs are fed into the loading end of the saw line and boards leave the saw line at the output end thereof.

The inventive machine 1 is especially suitable as a final dividing operation, wherein the heart piece of the log, also known as a four-sided cant, is divided into beams and boards. However, the inventive machine 1 may also be utilized more upstream in the saw line, wherein the outer parts of the log are separated/removed in order to obtain boards as well as said four-sided cant/block.

In general, a machine 1 configured for dividing a timber body 2 into smaller timber pieces 3, comprises a feeder unit 4 and a sawing station 5, wherein the feeder unit 4 is located upstream the sawing station 5, seen in the feeding direction of the timber body 2. The sawing station 5 comprises three or four band saws having one endless saw band/blade each. The timber body 2 is divided into smaller timber pieces 3 by the saw bands as it is fed into/through the sawing station 5 by the feeder unit 4. The machine 1 may also comprise a downstream feeder/pulling unit (not disclosed), configured to pull the smaller timber pieces 3 out of the sawing station 5 and to feed the smaller timber pieces 3 towards the next station in the saw line.

The sawing station 5 comprises a first/leading sawing unit, generally designated 6, and a second/trailing sawing unit, generally designated 7, wherein the second sawing unit 7 is located downstream the first sawing unit 6, seen in the feeding direction of the timber body 2.

The first sawing unit 6 comprises a set of first saw band(s)/blade(s) 8 and a pair of first support rollers 9 configured to cooperate with the set of first saw band(s) 8. According to various embodiments, the set of first saw band(s) 8 comprises one or two saw bands.

The second sawing unit 7 comprises a set of second saw band(s)/blade(s) 10 and a pair of second support rollers 11 configured to cooperate with the set of second saw band(s) 10. According to various embodiments, the set of second saw band(s) 10 comprises one or two saw bands.

According to a conventional configuration of the sawing station 5, the set of first saw band(s) 8 comprises two saw bands and the set of second saw band(s) 10 comprises two saw bands, such that five smaller timber pieces are obtained as output from the timber body dividing operation. At least one of the saw bands of the set of first saw band(s) 8 and the set of second saw band(s) 10 may be displaced in the transverse direction and be located alongside the path of the timber body 2, i.e. in order not to engage the timber body 2 during the timber body dividing operation.

Possible horizontal rollers and/or conveyer belts/chains are removed for the sake of clarity when reading the drawings.

The support rollers 9, 11 are rotatable around vertical centre axes, and they may be driven or undriven or combinations thereof. The support rollers 9, 11 are configured to engage/abut the timber body 2 during the timber body dividing operation, and are configured to control/guide the position of the timber body 2 during the timber body dividing operation.

When the sawing station 5 comprises four active saw bands in total, the station generates five smaller timber pieces 3, more precisely two outer pieces, two inner pieces and one center piece. When the sawing station 5 comprises three active saw bands in total, the station generates four smaller timber pieces 3, usually two outer pieces, one inner piece and one center piece.

Each endless saw band 8, 10 is part of a band saw, wherein each band saw comprises a supporting framework/column carrying an upper saw band pulley/wheel and a lower saw band pulley/wheel, and wherein the endless saw band is carried by and driven by the saw band pulleys. The body of the individual saw band 8, 10 is arranged in parallel to the feeding direction of the timber body 2, wherein the teeth of the saw bands are facing the upstream direction. According to various embodiments, the band saws are arranged in pairs, each pair having one band saw on each side of the feed path of timber bodies due to the construction/nature of conventional band saws. The set of first saw band(s) 8 are arranged transversally inside the set of second saw band(s) 10. According to various embodiments, the second set of saw band(s) 10 comprises only one saw band and one corresponding band saw, wherein the saw band 10 of the second set is arranged transversally outside one of the saw bands 8 of the first set.

Each saw band 8, 10 has a total thickness/kerf comprising the thickness of the body of the saw band and the lateral protrusion/side clearance of the teeth from the body, i.e. the total thickness/kerf of the saw band is equal to the width of the saw cut generated by the saw band. According to various embodiments, the total thickness of the saw band is in the range 2.5-3 millimeters, and the thickness of the body of the saw bands is in the range 1.3-1.6 millimeters. The side clearance of the teeth on each side is in the range 0.5-0.8 millimeters.

According to various embodiments, the location of each saw band 8, 10 is adjustable in the transverse direction in relation to the feed path of the timber body 2, by displacing the saw band in relation to the supporting framework/column of the band saw and/or by displacing the entire band saw. Thereby, different timber bodies 2 may be divided into a variable number of smaller timber pieces 3 that presents variable dimensions, in order to optimize the output from the raw material/timber body 2.

Each timber body 2 approaching the machine 1 has a so-called nominal or theoretical width. The nominal width of the individual timber body 2 approaching the machine 1 is obtained/determined from the settings in an upstream station, i.e. intended output dimensions from the upstream station. The nominal width is usually unique for each timber body 2 in a batch of timber bodies, i.e. may be different for different timber bodies 2. In some situations/operations the nominal width is predetermined and constant for an entire batch of timber bodies 2.

Each timber body 2 approaching the machine 1 also has a real width that is more or less constant along the entire length of the individual timber body 2, i.e. actual output dimensions from the upstream station. The real width is usually unique for each timber body 2 in a batch of timber bodies, i.e. may be different for different timber bodies 2. The real width of the individual timber body 2 approaching the machine 1 is measured/determined upstream the sawing station 5 of the machine 1, i.e. before the timber body 2 is fed into the sawing station 5. The real width of the timber body 2 may be determined at the feeder unit 4 of the machine 1 by means of suitable sensors, settings, or the like. The real width of the timber body 2 is equal to or less than a predetermined nominal width of the timber body 2.

According to various embodiments, the location of each support roller 9, 11 is adjustable in the transverse direction in relation to the feed path of the timber body 2 by displacing the support roller in relation to the supporting framework/column of the band saw, and/or in relation to the feed path by displacing the entire band saw. The pair of first support rollers 9 are displaceable in the transverse direction in relation to the set of first saw band(s) 8, and the pair of second support rollers 11 are displaceable in the transverse direction in relation to the set of second saw band(s) 10.

According to various embodiments, each pair of support rollers is configured to engage/abut the timber body 2 along an imaginary geometrical reference line, which are transverse in relation to the feeding direction and which in the axial direction is located just upstream the corresponding set of saw band(s). The axial distance between the geometrical reference lines of the pair of first support rollers 9 and the pair of second support rollers 11, respectively, is in the range 200-600 millimeters, and the axial distance between a reference line and teeth of the cooperating set of saw band(s) is in the range 20-50 millimeters.

According to various embodiments, the feeder unit 4 comprises a base 12 and several rollers/cylinders 13 connected to the base 12, wherein the cylinders 13 and/or the base 12 are adjustable in the transverse direction. The cylinders 13 are rotatable around vertical center axes, and one or more of them are driven. The cylinders 13 are configured to engage/abut the timber body 2 and feed the timber body 2 in an axial direction into the sawing station 5, while a power source, e.g. an electric motor (not shown), brings the cylinders 13 to rotate. The feeder unit 4 operate in a conventional way. The mutual distance between the cylinders 13 is equal to the real width of the timber body 2.

Reference is now made to FIGS. 5-8 in order to describe the inventive method and the operation/control of the inventive machine 1.

According to various embodiments, during the timber body dividing operation, the timber body 2 is fed into/through the sawing station 5 by means of the feeder unit 4 and the pair of first support rollers 9 are positioned at a mutual distance correlating to the nominal width of the timber body 2 before the timber body 2 is fed into the sawing station 5. According to various embodiments, said mutual distance correlating to the nominal width of the timber body 2 is equal to or slightly less than the nominal width of the timber body 2. Preferably, said mutual distance between the pair of first support rollers 9 is equal to the nominal width of the timber body 2 minus 2-3 millimeters, in order to secure that the pair of first support rollers 9 engage the timber body 2 when the timber body reaches the pair of first support rollers 9 should the real width of the timber body 2 be slightly less than the predetermined nominal width. The pair of first support rollers 9 are preferably located at a mutual distance that is slightly less than the nominal width of the timber body 2, in order to achieve adequate guiding/control of the timber body 2 at the set of first saw band(s) 8. Thus, when the timber body 2 reaches the pair of first support rollers 9, located closer to each other than the real width of the timber body 2, one or both of the support rollers 9 spring outwards and engage the sides of the timber body 2. Thus, when the pair of first support rollers 9 are in engagement with the timber body 2, the mutual distance between the pair of first support rollers 9 is equal to the real width of the timber body 2.

Figure 5:
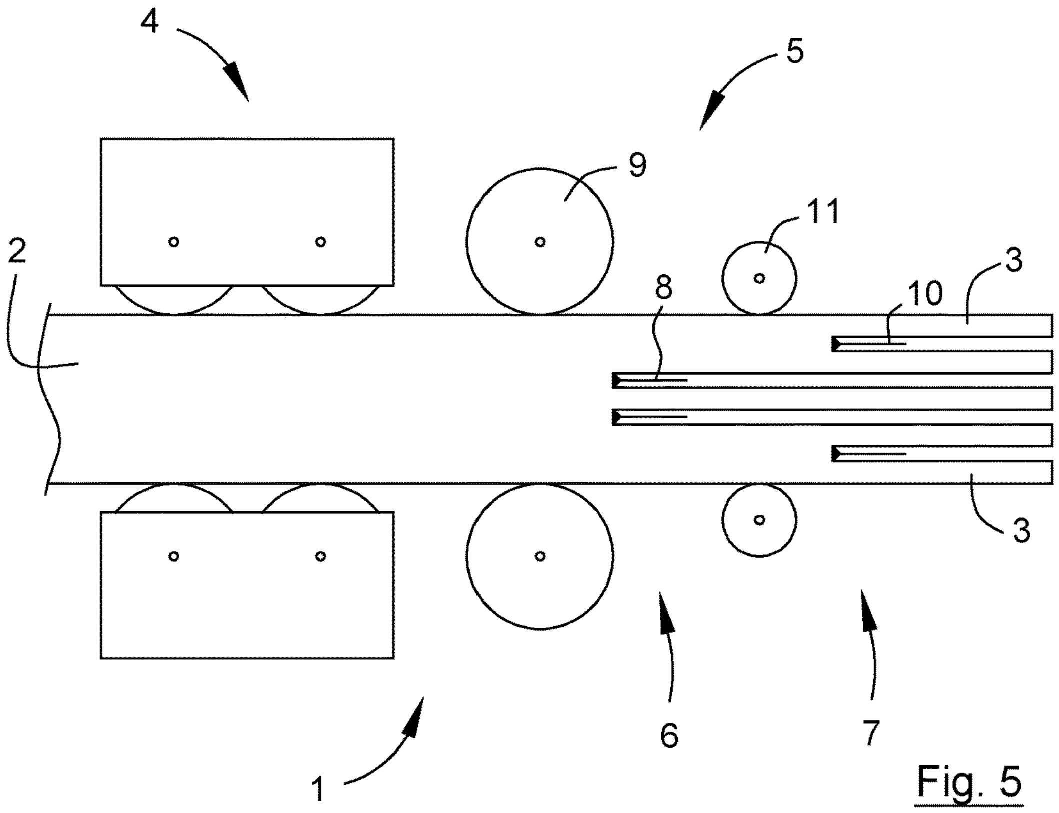
FIG. 5 is a schematic view from above of the inventive machine according to FIG. 4, at the beginning of a timber body dividing operation.
Figure 6:
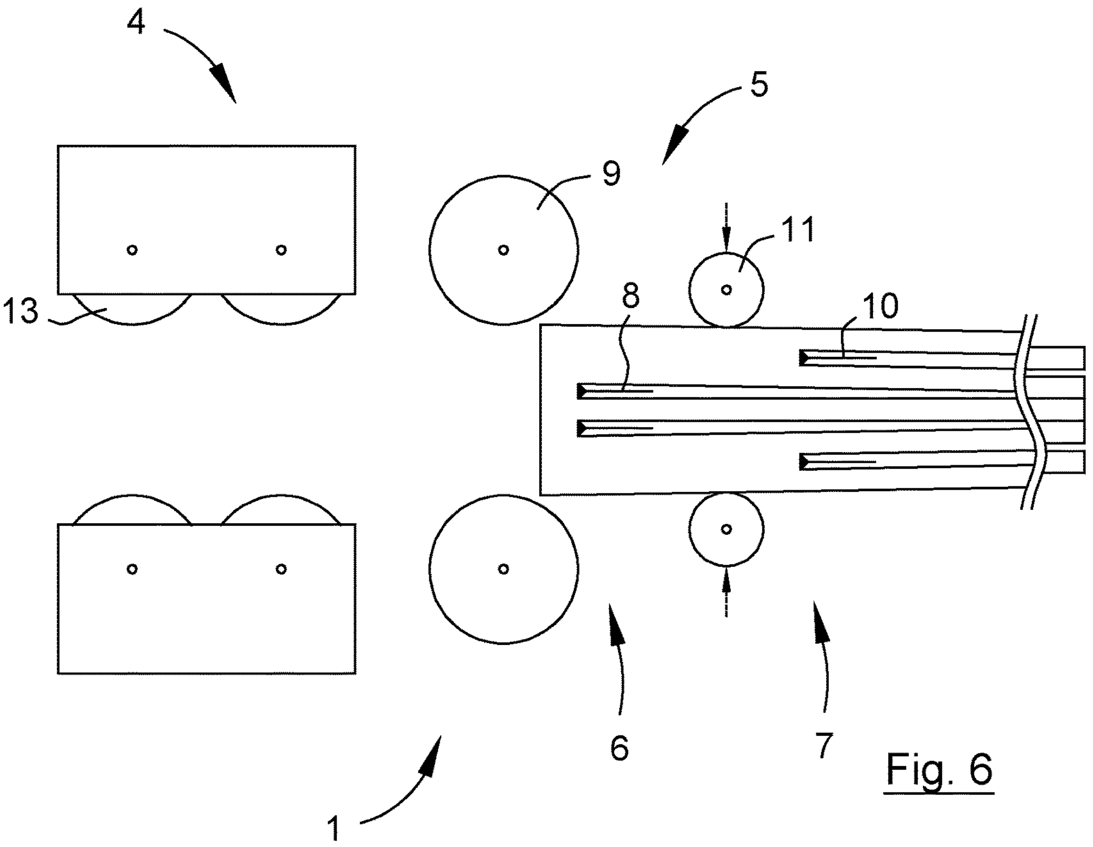
FIG. 6 is a schematic view from above of the inventive machine according to FIG. 4, approaching the end of a timber body dividing operation.

At the beginning of the timber body dividing operation, FIG. 5, the pair of second support rollers 11 are positioned at an initial mutual distance correlating to the real width of the timber body 2. The pair of second support rollers 11 are positioned at the initial mutual position before the timber body 2 reaches the second sawing unit 7, wherein the pair of second support rollers 11 engage the timber body 2 when the timber body 2 reaches the second sawing unit 7. According to various embodiments, said initial mutual distance correlating to the real width of the timber body 2 is equal to or slightly less than the real width of the timber body 2. Preferably, said initial mutual distance between the pair of second support rollers 11 is equal to the real width of the timber body 2 minus a factor equal to 0.5-1.5 millimeters. Said factor shall not be more than two side clearances of the teeth of the saw bands of the set of first saw band(s) 8. The pair of second support rollers 11 are preferably located at a mutual distance that is slightly less than the real width of the timber body 2, in order to bias the partly divided outer pieces inwards and thereby achieve a better guiding/control of the initially divided outer pieces of the timber body 2 at the set of second saw band(s) 10.

During the timber body dividing operation, the mutual distance between the pair of second support rollers 11 is decreased from the initial mutual distance until reaching a final mutual distance at the end of the timber body dividing operation. Preferably, the two second support rollers 11 are displaced at the same pace/rate inwardly. The displacement can be continuous and/or intermittent/stepwise.

The final mutual distance between the pair of second support rollers 11 correlate to the real width of the timber body 2 minus the total thickness/kerf of the set of first saw band(s) 8. Preferably, said final mutual distance between the pair of second support rollers 11 is equal to the real width of the timber body 2 minus the total thickness/kerf of the set of first saw band(s) 8. The pair of second support rollers 11 are preferably located at a mutual distance that is equal to the real width of the timber body 2 minus the total thickness/kerf of the set of first saw band(s) 8, such that the timber body 2 reaching the saw bands of the set of second saw band(s) 10 is perceived as being solid since the saw cuts from the set of first saw band(s) 8 are eliminated, and thereby a better guiding/control of the initially divided outer pieces of the timber body 2 is achieved at the set of second saw band(s) 10.

According to various embodiments, the displacement pace/rate inwardly increase during the timber body dividing operation.

According to various embodiments, the mutual distance between the pair of second support rollers 11 is constant and equal to the initial mutual distance during a considerable part of the timber body dividing operation, i.e. the first part of the timber body dividing operation. For instance, at least until the trailing end of the timber body is located 1 meter upstream the pair of first support rollers 9, and maximally until the trailing end of the timber body is located 0.6 meter upstream the pair of first support rollers 9. Preferably, at least until the trailing end of the timber body is located 0.9 meter upstream the pair of first support rollers 9.

According to various embodiments, the mutual distance between the pair of second support rollers 11 is constant and equal to the initial mutual distance at least as long as the feeder unit 4 is in engagement/abutment with the timber body 2, i.e. until the trailing edge of the timber body 2 disengage the cylinder 13 of the feeder unit 4, and consequently the final mutual distance between the pair of second support rollers 11 is reached after the feeder unit 4 disengage the timber body 2.

According to various embodiments, the mutual distance between the pair of second support rollers 11 is constant and equal to the initial mutual distance as long as the pair of first support rollers 9 are in engagement/abutment with the timber body 2, and consequently the final mutual distance between the pair of second support rollers 11 is reached after the pair of first support rollers 9 disengage the timber body 2.

After the part of the timber body dividing operation having constant mutual distance between the pair of second support rollers 11, and when the set of first saw band(s) 8 are still active dividing the timber body 2, i.e. in engagement with the timber body 2, the mutual distance between the pair of second support rollers 11 is decreased, but not all the way to the final mutual distance. Preferably, the mutual distance is decreased maximally to the real width of the timber body 2 minus the sum of the side clearances of the teeth of the set of first saw band(s) 8. Thus, as long as the set of first saw band(s) 8 are in engagement with the timber body 2 these saw bands cannot be clamped/wedged.

Figure 7:
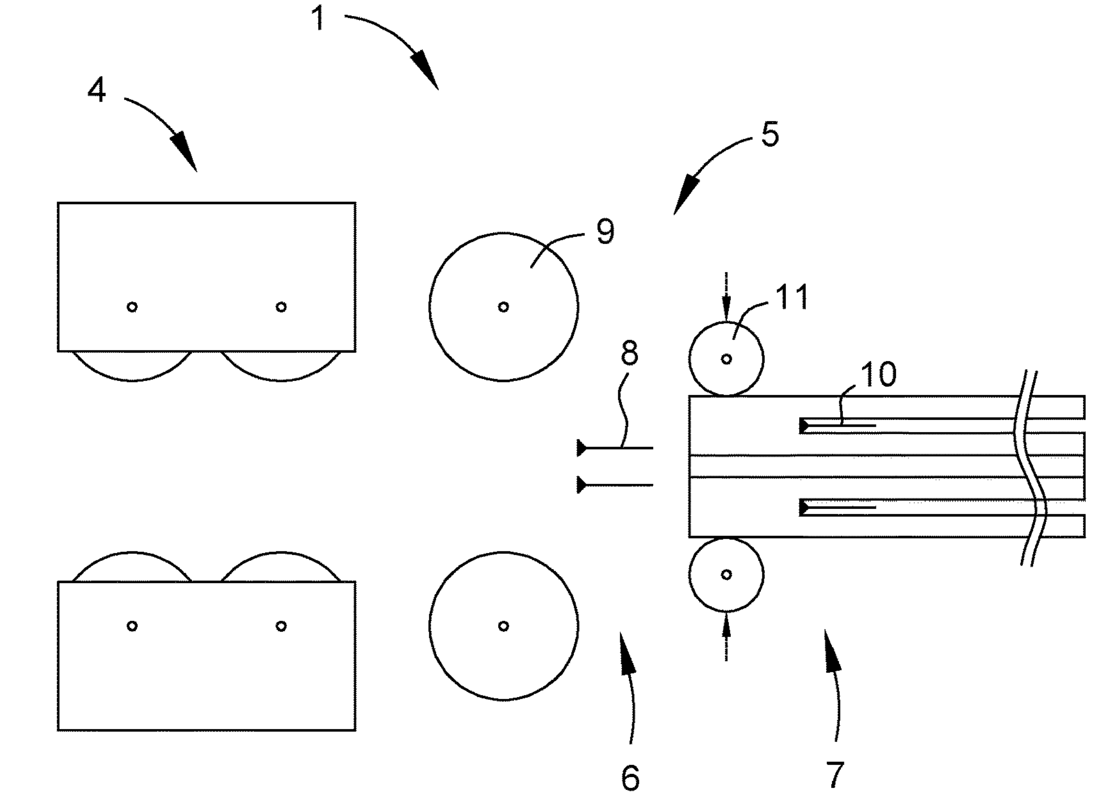
FIG. 7 is a schematic view from above of the inventive machine according to FIG. 4, at the end of a timber body dividing operation.
Figure 8:
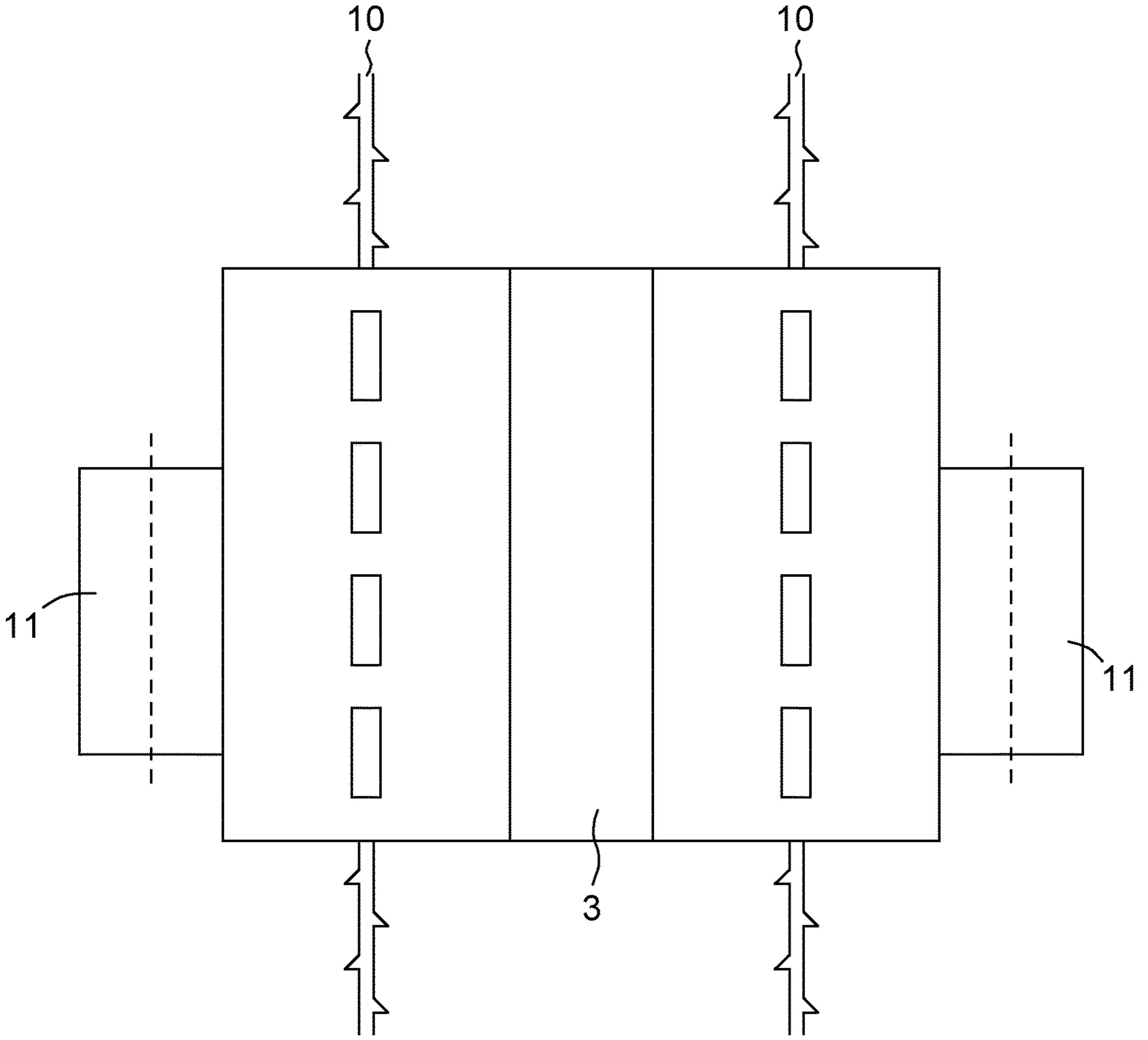
FIG. 8 is a schematic end view from the upstream direction of the trailing support rollers and the trailing saw bands, at the end of a timber body dividing operation.

According to various embodiments, the final mutual distance between the pair of second support rollers 11 is reached after the set of first saw band(s) 8 disengage the timber body 2. As is seen in FIGS. 7 and 8. Preferably after the teeth of the set of first saw band(s) 8 disengage the timber body 2, and most preferably after the trailing edge of the timber body 2 has passed the set of first saw band(s) 8, in order to decrease the risk of wedging the set of first saw band(s) 8. Thus, the final decrease of the mutual distance between the pair of second support rollers 11 is performed after the trailing edge of the timber body 2 has passed the teeth of the set of first saw band(s) 8, and before the trailing edge of the timber body 2 has reached the pair of second support rollers 11.

According to various embodiments, a riving knife (not disclosed) may be located directly downstream the trailing edge of each saw band of the set of first saw band(s) 8, in order to secure that the set of first saw band(s) 8 are not wedged. Such riving knives have less thickness than the total thickness/kerf of the corresponding saw band, and the thickness is equal to or more than the thickness of the body of the corresponding saw band.

According to various embodiments, each saw band of the set of second saw band(s) 10 is associated with one support roller of the pair of second support rollers 11, wherein the transverse distance between the individual saw band of the set of second saw band(s) 10 and the corresponding support roller of the pair of second support rollers 11 is kept constant during the timber body dividing operation, i.e. also during the decrease of the mutual distance between the pair of second support rollers 11. The support roller 11 associated with the individual saw band 10 is the support roller located closest to the individual saw band. Thus, all displacement of the support rollers of the pair of second support rollers 11 described above is also applicable to the saw band(s) of the set of second saw band(s) 10. Thereby, not only the dimensions of the outer timber pieces 3 are controlled but will also be constant along the entire length of the timber piece 3.

In some situations the timber body 2, especially when in the shape of a four-sided cant, is curved/arched along the length thereof, e.g. having a radius of curvature from about 50 meters and up, wherein a straight timber body 2 has infinite radius of curvature, which means that the bow height of a 4 meter long timber body 2 may be as big as 40 millimeters. Thus, the timber body 2 is preferably curve sawn in order to obtain an optimal output, wherein curve sawing means that, during the timber body dividing operation, the timber body 2 is fed along a curve path which corresponds to the inherent curvature of the timber body 2. Conventionally this is at least partly realized by means of controlling the orientation/operation of the feeder unit 4.

According to various embodiments, in connection with the present invention, the curve sawing may be at least partly realised by having the centre line of the pair of second support rollers 11 offset the centre line of the saw line, i.e. offset the centre line of the pair of first support rollers 9. The magnitude of the offset correlate to the inherent bow height of the timber body 2. The set of second saw band(s) 10 are offset accordingly.

Feasible Modifications of the Invention

The invention is not limited only to the embodiments described above and shown in the drawings, which primarily have an illustrative and exemplifying purpose. This patent application is intended to cover all adjustments and variants of the preferred embodiments described herein, and the present invention is consequently defined by the wording of the appended claims and the equivalents thereof and the equipment can be modified in all conceivable ways within the scope of the appended claims.

It shall also be pointed out that all information about/concerning terms such as above, under, upper, lower, etc., shall be interpreted/read having the equipment oriented according to the figures, having the drawings oriented such that the references can be properly read. Thus, such terms only indicates mutual relations in the shown embodiments, which relations may be changed if the inventive equipment is provided with another structure/design.

It shall also be pointed out that even thus it is not explicitly stated that features from a specific embodiment may be combined with features from another embodiment, the combination shall be considered/regarded obvious, when the combination is possible.

The invention claimed is:

1. A method for controlling a machine for dividing a timber body into a plurality of smaller timber pieces during a timber body dividing operation, wherein the machine comprises a feeder unit and a sawing station, the feeder unit being located upstream the sawing station, and wherein the sawing station comprises:

a first sawing unit comprising a set of first saw band(s) and a pair of first support rollers configured to cooperate with the set of first saw band(s), and a second sawing unit located downstream said first sawing unit, and comprising a set of second saw band(s) and a pair of second support rollers configured to cooperate with the set of second saw band(s), wherein the location of each support roller is adjustable in the transverse direction and wherein the support rollers are configured to engage the timber body during the timber body dividing operation, the method wherein:

feeding the timber body by means of the feeder unit into the sawing station during the timber body dividing operation, wherein the pair of first support rollers engage the timber body, before the timber body reaches the second sawing unit, positioning the pair of second support rollers at an initial mutual distance correlating to a real width of the timber body, wherein the pair of second support rollers engage the timber body when the timber body reaches the second sawing unit, and decreasing the mutual distance between the pair of second support rollers during the timber body dividing operation from said initial mutual distance until reaching, at the end of the timber body dividing operation, a final mutual distance between the pair of second support rollers correlating to the real width of the timber body minus the total thickness of the set of first saw band(s).

2. The method according to claim 1, wherein the method further comprises the steps of:

before the timber body is fed into the sawing station, determining the real width of the timber body, wherein the real width of the timber body is equal to or less than a predetermined nominal width of the timber body, and before the timber body is fed into the sawing station, positioning the pair of first support rollers at a mutual distance correlating to the nominal width of the timber body.

3. The method according to claim 1, wherein the initial mutual distance between the pair of second support rollers is equal to or less than the real width of the timber body.

4. The method according to claim 1, wherein the initial mutual distance between the pair of second support rollers is equal to the real width of the timber body minus 0.5-1.5 millimetres.

5. The method according to claim 1, wherein the decrease of the mutual distance between the pair of second support rollers during the timber body dividing operation is stepwise and/or continuous.

6. The method according to claim 1, wherein the final mutual distance between the pair of second support rollers is reached after the pair of first support rollers disengage the timber body.

7. The method according to claim 1, wherein the final mutual distance between the pair of second support rollers is reached after the teeth of the set of first saw band(s) disengage the timber body.

8. The method according to claim 1, wherein each saw band of the set of second saw band(s) is associated with one support roller of the pair of second support rollers, and wherein the transverse distance between the individual saw band of the set of second saw band(s) and the corresponding support roller of the pair of second support rollers is kept constant during the timber body dividing operation.

9. A machine for dividing a timber body into a plurality of smaller timber pieces during a timber body dividing operation, wherein the machine comprises a feeder unit and a sawing station, the feeder unit being located upstream the sawing station, and wherein the sawing station comprises:

a first sawing unit comprising a set of first saw band(s) and a pair of first support rollers configured to cooperate with the set of first saw band(s), and a second sawing unit located downstream said first sawing unit, and comprising a set of second saw band(s) and a pair of second support rollers configured to cooperate with the set of second saw band(s), wherein the location of each support roller is adjustable in the transverse direction and wherein the support rollers are configured to engage the timber body during the timber body dividing operation, the machine wherein the pair of second support rollers are configured to be displaced in relation to each other during a timber body dividing operation from an initial mutual distance correlating to a predetermined real width of the timber body at the beginning of the timber body dividing operation to a final mutual distance correlating to the real width of the timber body minus the total thickness of the set of first saw band(s) at the end of the timber body dividing operation.

10. The machine according to claim 9, wherein the set of first saw band(s) comprises two saw bands.

11. The machine according to claim 9, wherein the set of second saw band(s) comprises one or two saw band(s).

12. The machine according to claim 9, wherein the pair of first support rollers are located upstream the set of first saw band(s).

13. The machine according to claim 9, wherein the pair of second support rollers are located upstream the set of second saw band(s).

* * * * *